United States Patent [19]
Chao

[11] Patent Number: 5,145,658
[45] Date of Patent: Sep. 8, 1992

[54] RECLAIMING OF HEAT OF REACTION ENERGY FROM AN ALKALINE SCRUBBING SOLUTION USED IN ACID GAS REMOVAL PROCESSES AND APPARATUS THEREFOR

[75] Inventor: I-Meen Chao, Overland Park, Kans.

[73] Assignee: Eickmeyer & Associates, Inc., Overland Park, Kans.

[21] Appl. No.: 755,689

[22] Filed: Sep. 6, 1991

Related U.S. Application Data

[63] Continuation-in-part of Ser. No. 619,246, Nov. 28, 1990, abandoned.

[51] Int. Cl.$^5$ ............. C01B 17/16; C01B 31/20; B01D 50/00
[52] U.S. Cl. .................... 423/232; 423/228; 423/DIG. 6; 422/168; 422/173
[58] Field of Search ............... 423/DIG. 6, 223, 228, 423/229, 232, 242, 243; 422/168, 173

[56] References Cited

U.S. PATENT DOCUMENTS 3,851,041 11/1974 Eickmeyer .................... 423/223
4,160,810 7/1979 Benson et al. ................. 423/223
4,409,191 10/1983 Osman ......................... 423/228

OTHER PUBLICATIONS

Olsen, John C. Unit Processes & Principles of Chemical Engineering, D. Van Nostrand Company 1932 pp. 1-3.

*Primary Examiner*—Gary P. Straub
*Attorney, Agent, or Firm*—Hovey, Williams, Timmons & Collins

[57] ABSTRACT

A process and apparatus is disclosed for reclaiming of heat of reaction energy from an alkaline scrubbing solution used in acid gas removal processes and apparatus therefor. The heat recovered is used to produce steam which may then be employed to assist in steam stripping the rich scrubbing solution to effect regeneration thereof. The rich scrubbing solution containing heat of reaction thermal energy is passed through a rich-reflux reboiler to recover a part of the energy to produce at least a part of the stripping steam, and then through a rich-lean reboiler under a reduced pressure to produce additional quantities of stripping steam. A reduction in steam requirements for regeneration of the rich alkaline scrubbing agent of at least 10% is thereby realized.

21 Claims, 2 Drawing Sheets

RECLAIMING OF HEAT OF REACTION ENERGY FROM AN ALKALINE SCRUBBING SOLUTION USED IN ACID GAS REMOVAL PROCESSES AND APPARATUS THEREFOR

This is a continuation-in-part application of an application filed Nov. 28, 1990 as Ser. No. 07/619,246 abandoned.

BACKGROUND OF THE INVENTION

1. Field of the Invention

This invention relates generally to processes and equipment for removal of acid gases, such as $CO_2$ and $H_2S$ from gas mixtures. In particular, the invention relates to an improved method and apparatus for reclaiming heat from the rich alkaline scrubbing solution which has been used to absorb the acid gases contained in the gaseous mixture.

2. Overview

Absorption of an acid gas by an alkaline scrubbing agent causes the rich scrubbing solution temperature to increase by virtue of the heat of reaction between the acid gas and the alkaline agent. However, absorption of the acid gas by the scrubbing solution lowers its boiling point. As a consequence, when the rich scrubbing solution is introduced into the regenerator where it is subjected to steam stripping, a significant amount of water and acid gas in the rich scrubbing solution flashes and goes overhead from the lowered boiling point scrubbing solution. Flash of water vapor and acid gas from the rich solution results in significant loss of energy from the rich scrubbing solution that would otherwise be available to produce steam for steam stripping makeup, or for export.

The present process therefore, provides an improved method and apparatus for recovering heat of reaction energy from the rich scrubbing solution in a manner which precludes significant loss of energy from the alkaline scrubbing agent as a result of water vapor and acid gas flash from the rich scrubbing solution when it is introduced into the regenerator.

3. Description of the Prior Art

Processes and equipment are well known for removing $CO_2$ and/or $H_2S$ from gas streams which contain such acid gases. There are various industrial and commercial sources of gas mixtures that contain acid gases. Sour natural gas is one source. The gas mixture resulting from enhanced oil recovery processes which utilize $CO_2$ also includes a quantity of acid gases. In addition, the low temperature shift effluent from a steam reformer reaction associated with an ammonia plant, contains substantial quantities of carbon dioxide and/or hydrogen sulfide. The process off gas in this instance leaves the processing equipment at a relatively high temperature and pressure, and usually contains significant amounts of steam as well. Many partial oxidation reactions also produce a gaseous effluent containing acid gases.

The acid gases are removed from the gas stream by absorption of the $CO_2$ and/or $H_2S$ in a hot aqueous alkaline scrubbing medium such as potassium carbonate, which is then regenerated by steam stripping. After passage of the gaseous mixture through the scrubber containing an alkaline scrubbing agent, the purified gas goes overhead while the rich scrubbing solution underflow is returned to a regenerator for steam stripping thereof.

The process of removing $CO_2$ and/or $H_2S$ from gas streams containing these acid gases can be made more efficient if thermal energy is recovered from the absorption medium in order that the reclaimed heat can be used to produce steam for use in regeneration of the hot alkaline scrubbing agent. Reduction of the regeneration heat requirements has been a much sought after goal. Production of significant quantities of steam over and above that required for steam stripping of the rich scrubbing solution to provide export steam represents a further advantageous result.

Eickmeyer in U.S. Pat. Nos. 3,932,582, 3,851,041 and 4,271,132 issued in 1976, 1974 and 1981 respectively taught that process waste heat contained in the raw gas stream may be recovered by condensing most of the steam before the gas stream is introduced into an absorber containing an alkaline absorption agent. Eickmeyer, however, did not suggest recovery of heat from the rich scrubbing solution leaving the absorber.

U.S. Pat. Nos. 3,823,222 to Benson, and No. 4,160,810, issued to Benson and McCray also teach that steam may be recovered from the hot process gas prior to passage of such gas through an alkaline agent absorber for use in stripping the rich scrubbing solution leaving the absorber. In these patents, the hot rich scrubbing solution is sent directly from the absorber to the regenerator with no suggestion being made that waste heat can efficiently be removed from that solution.

Osman in U.S. Pat. No. 4,409,191 teaches a cyclic process for the removal of acid gases from a feed gas stream comprising a hot, steam-containing gas mixture by means of an aqueous alkaline scrubbing solution which is continuously recycled between an absorber in which acid gases are absorbed by scrubbing solution and a regenerator wherein acid gases are desorbed by steam stripping. Stripping steam is at least partially derived from the hot, steam-containing gas mixture. Condensation and separation of the steam content of the hot process gas is carried out before the gas mixture enters the absorber. However, the Osman process does not teach or suggest reclaiming of heat from the rich scrubbing solution that is derived from the heat of reaction of the acid gas with the scrubbing agent and makes no mention of using such steam as a part of the steam makeup for stripping of the rich scrubbing solution introduced into the regenerator.

SUMMARY OF THE INVENTION

The efficiency of an alkaline agent acid gas removal process is enhanced in accordance with this invention by recovery of a substantial part of the heat of reaction energy contained in the rich scrubbing solution before delivery of the rich solution to the regenerator. The recovered energy may be in the form of steam which is used to supplement the steam requirements of the rich alkaline agent regenerator, or as steam that may be exported to another use in the process facility or sold to third parties.

The exothermic reaction of the acid gas with the alkaline scrubbing agent causes the temperature of the scrubbing solution to increase. In most instances, the temperature of the rich scrubbing solution is raised to a level of at least about 180° F. Reaction of the acid gas with the alkaline scrubbing agent not only adds to the heat content of the alkaline scrubbing solution, but there is also a concomitant lowering of the boiling point of the scrubbing agent, depending upon the degree of conversion of the alkaline agent. For example, if the scrubbing agent is potassium carbonate, reaction of an acid gas with the potassium carbonate converts the latter to potassium bicarbonate. In a typical absorption system, the lean absorption solution may contain, for example, about 70% $K_2CO_3$ and about 30% $KHCO_3$. When a gas stream containing an acid gas is passed through an alkaline scrubber, reaction of the acid gas with the carbonate solution results in conversion of up to about 90% of the carbonate, thus leaving about 10% $K_2CO_3$.

The steam and acid gas(es) leaving the top of the regenerator pass through a cooler which produces a condensate. That condensate is directed to one side of a rich-reflux reboiler for indirect heat exchange with the rich scrubbing solution leaving the absorber at a temperature above about 180° F. Secondary steam produced in the rich-reflux reboiler is mixed with steam introduced into the regenerator for stripping of the rich scrubbing solution delivered to the regenerator. After leaving the rich-reflux reboiler and before introduction into the regenerator, the rich scrubbing solution is directed through one side of a rich-lean reboiler which also receives on the other side thereof, the condensate leaving the rich-reflux reboiler.

In those instances where the gas mixture undergoing treatment for removal of acid gas therefrom also includes steam, recovery of steam through provision of the rich-lean reboiler apparatus for recovering heat from the rich scrubbing solution may be enhanced by reclaiming of steam from the raw process gas. Steam produced as a result of heat and/or steam recovery from the process gas stream may be delivered to a steam jet having a vacuum port connected to the condensate side of the rich-lean reboiler. In this manner, tertiary steam may be produced which is added to the primary steam and secondary steam for stripping of the regenerator. In accordance with a preferred embodiment of the invention, the rich scrubbing solution at a temperature above about 240° F. is brought into heat exchange relationship with condensate at a temperature no greater than about 230° F.

Recovery of the heat of reaction energy from the rich scrubbing solution reduces, if not totally eliminates, the need for import steam requirements, or burning of fuel to produce the steam required for regeneration of the scrubbing agent. The process described in so efficient that when a significant amount of waste heat in the form of steam is also recovered from the raw process gas, as well as the heat of reaction energy produced in the absorber, the steam available is so abundant that in many instances, steam is actually available for export to other parts of the process.

Removal of heat from the rich scrubbing solution before regeneration thereof also has the related advantage of lowering the temperature of the scrubbing solution before introduction of the scrubbing medium into the regenerator which limits the amount of water vapor and acid gas which flashes in the regenerator. A substantial amount of heat is therefore recovered from the rich scrubbing solution that would otherwise be lost by flash of water vapor and/or acid gases from the solution by virtue of its lowered boiling point.

In order to assure adequate efficiency of recovery of waste heat to produce steam for further use thereof, either in regeneration of the alkaline scrubbing agent, or for export, it is necessary that the temperature approach difference between the condensate and the rich scrubbing solution in the rich-reflux reboiler and the rich-lean reboiler respectively be maintained at a level of at least about +2° F. and desirably above about +5° F.

DETAILED DESCRIPTION OF THE PREFERRED EMBODIMENT

Figure 1:
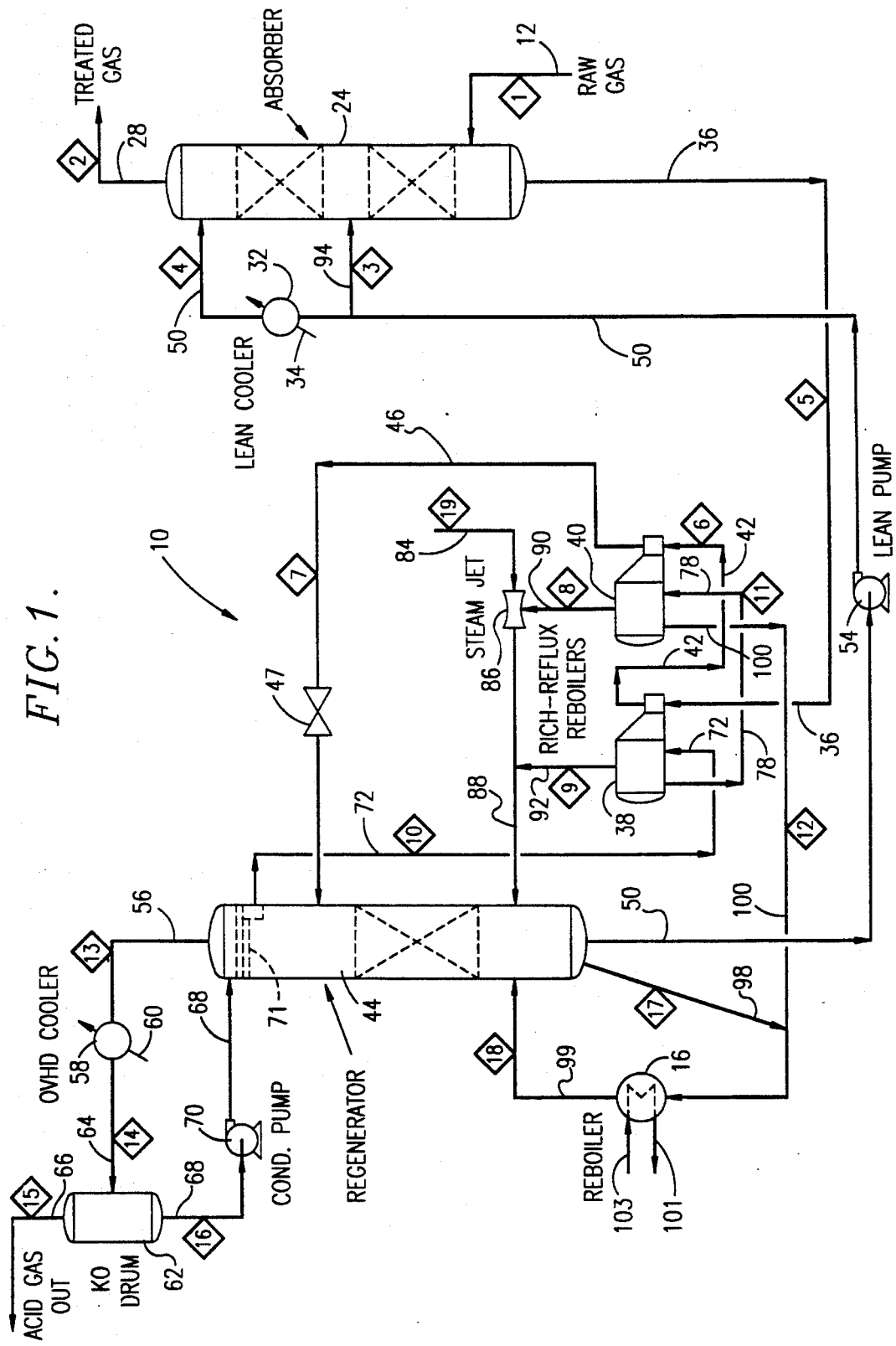
FIG. 1 is a diagrammatic representation of a flow chart illustrating a preferred embodiment of the invention wherein heat is recovered from the rich scrubbing solution by interposing two rich-reflux reboilers in the rich scrubbing solution line between an aqueous hot alkaline absorber and a regenerator for the scrubbing solution.

Preferred apparatus for reclaiming heat from a rich alkaline scrubbing solution which has been used to absorb acid gases from a gaseous mixture employing the improved method of this invention is schematically illustrated in FIG. 1. The gaseous mixture is of the type where there is a need to remove acid gases contained therein such as $CO_2$ and/or $H_2S$. An exemplary gaseous mixture in this respect is one that results from the use of $CO_2$ containing gas streams present as a in enhanced oil recovery processes. Sour natural gas is another typical gas mixture wherein there is often a need to remove $CO_2$ and/or $H_2S$ contained in the gaseous product. Natural gas from a well head can contain carbon dioxide in amounts as high as 50% or somewhat greater. Other sour gas streams may have levels of carbon dioxide of at least about 90%. These sour gas streams may also often contain hydrogen sulfide in conjunction with or instead of carbon dioxide.

In FIG. 1, the raw gas containing $CO_2$ and/or $H_2S$ is directed to apparatus 10 via line 12 that is connected to the inlet at the lower part of an absorber 24 which receives a hot alkaline scrubbing agent such as potassium carbonate. Rich scrubbing solution leaves absorber tower 24 through line 36 connected to the lower end thereof and leading to the tube side of rich-reflux reboiler 38. The rich solution leaves reboiler 38 via line 42 in turn connected to the tube side of rich-reflux reboiler 40. The outlet of the tube side of reboiler 40 is connected to the upper section of alkaline scrubbing solution regenerator 44 through the medium of a line 46. Valve 47 interposed in line 46 permits selective control of the flow therethrough.

Regenerator tower 44 has an outlet line 50 connected to the bottom end thereof which leads to the upper end of absorber 24. A pump 54 is provided in line 50 for directing the lean alkaline scrubbing solution into the absorber 24 under a suitable pressure. A cooler 32 which receives cooling water via line 34 serves to lower the temperature of the lean scrubbing solution to a predetermined value before delivery of the lean solution into the top of absorber tower 24. Bypass line 94 permits a certain proportion of the lean solution to be directed into the central part of absorber tower 24 between the packing sections therein in bypassing relationship to cooler 32. Purified gas exits from absorber 24 through line 28.

Steam is used to strip the rich scrubbing solution delivered to regenerator 44 from absorber 24. To that end, steam is introduced into the lower part of regenerator tower 44 through line 88 that is connected to a source line 84. It can be seen from FIG. 1 that it is preferred that line 84 be connected to an inlet of a steam jet 86. The other inlet of jet 86 is connected to the shell side of reboiler 40 by a line 90. Passage of steam through jet 86 from line 84 to line 88 causes reduced pressure to exist at the inlet of the jet having line 90 connected thereto, thus lowering the pressure inside of the shell side of reboiler 40. A line 92 serves to connect the shell side of reboiler 38 directly with line 88.

Reclaimed acid gas which includes a quantity of water vapor exits from regenerator tower 44 through line 56 which leads to overhead cooler 58. The outlet of cooler 58 is joined to knock out drum 62 by a line 64. Cooling water is delivered to cooler 58 via line 60. After removal of substantial water from the acid gas stream in knock out drum 62 the dehumidified acid gas is directed to storage or use through discharge line 66. Water removed from the acid gas in knock out drum 62 exits from the knock out vessel through line 68 having a condensate pump 70 interposed therein. Line 68 is joined to the upper end of regenerator tower 94 above the separator section 71 inside of regenerator 44. Condensate which collects in the upper end of absorber tower 44 is removed therefrom and directed to the tube side of reboiler 38 through line 72. Line 78 connects the shell side of reboiler 38 with the shell side of reboiler 40.

A part of the lean scrubbing solution which leaves regenerator tower 44 exits therefrom via line 98 which joins with line 100 extending from the shell side of reboiler 40 to the inlet of reboiler 16. The outlet of reboiler 16 is connected to the lower end of regenerator tower 44 by a line 99. Steam or a hot liquid available from other parts of a process facility is introduced into reboiler 16 through supply and return lines 101 and 103.

OPERATION

For a better understanding of the operation of apparatus 10, the box score of Example 1 hereunder sets forth a representative material balance for a typical process which may be advantageously carried out in accordance with the present invention to purify a gas stream containing an acid gas such as CO2. It is to be understood in this respect that the specific parameters set out in the box score are for exemplary purposes only to illustrate the degree of heat recovery from the rich scrubbing solution that may be obtained thereby enhancing the overall efficiency of the scrubbing process.

The exothermic reaction between the acid gas and the alkaline scrubbing agent produces significant amounts of thermal energy in the rich scrubbing solution output from absorber 24. In prior processes, this heat has been lost and has not been available for use in regenerating the scrubbing solution, or to provide additional export steam. Incorporation of rich-reflux boilers 38 and 40 and rich in the present process permits advantageous recovery of a substantial part of the heat of reaction thermal energy contained in the rich scrubbing solution exiting from absorber 24. An especially important feature of the process is the use of steam jet 86 which has an input port connected to rich-reflux reboiler 40 to thereby lower the pressure in the reboiler and permit recovery of steam in a more efficient manner by decreasing the temperature approach required between the liquid inputs into reboilers 38 and 40 in order to obtain efficient heat transfer.

For convenience, the streams of the illustrative process as set out in the schematic representation of FIG. 1 are keyed to the box score of Example by numbers within a diamond. In the description hereof, the streams coded by a diamond in the drawing are identified as "S-n" wherein "S" represents "stream" and "n" is the number assigned to that stream in the box score.

EXAMPLE 1

| Stream # | S-1 | S-2 | S-3 | S-4 | S-5 | S-6 | S-7 | S-8 | S-9 |
|---|---|---|---|---|---|---|---|---|---|
| Pres, Psia | 515.0 | 510.0 | 520.0 | 520.0 | 515.0 | 510.0 | 505.0 | 17.0 | 23.5 |
| Temp, °F. | 200.0 | 200.0 | 241.3 | 200.0 | 251.1 | 243.0 | 229.0 | 219.4 | 236.6 |
| Gas, lb/h | 162796 | 111315 | 0 | 0 | 0 | 0 | 0 | 16937 | 8937 |
| Comp lb/mph | | | | | | | | | |
| $N_2$ | 172.26 | 172.26 | 0.00 | 0.00 | 0.00 | 0.00 | 0.00 | 0.00 | 0.00 |
| $C_1$ | 2175.16 | 2175.16 | 0.00 | 0.00 | 0.00 | 0.00 | 0.00 | 0.00 | 0.00 |
| $C_2$ | 706.82 | 706.82 | 0.00 | 0.00 | 0.00 | 0.00 | 0.00 | 0.00 | 0.00 |
| $C_3$ | 572.84 | 572.84 | 0.00 | 0.00 | 0.00 | 0.00 | 0.00 | 0.00 | 0.00 |
| $C_4+$ | 387.58 | 387.58 | 0.00 | 0.00 | 0.00 | 0.00 | 0.00 | 0.00 | 0.00 |
| $CO_2$ | 1200.00 | 12.08 | 0.00 | 0.00 | 0.00 | 0.00 | 0.00 | 0.00 | 0.00 |
| $H_2O$ | 27.34 | 71.71 | 0.00 | 0.00 | 0.00 | 0.00 | 0.00 | 940.16 | 496.06 |
| Total | 5242.00 | 4098.45 | 0.00 | 0.00 | 0.00 | 0.00 | 0.00 | 940.16 | 496.06 |
| Liquid, lb/h | 0 | 0 | 1288787 | 175744 | 1516012 | 1516012 | 1516012 | 0 | 0 |
| Sp Gr @ PT | — | — | 1.181 | 1.204 | 1.176 | 1.180 | 1.189 | — | — |
| Comp lb/mph | | | | | | | | | |
| $K_2CO_3$ | 0.00 | 0.00 | 1512.73 | 206.28 | 531.09 | 531.09 | 531.09 | 0.00 | 0.00 |
| $KHCO_3$ | 0.00 | 0.00 | 1629.09 | 222.15 | 4227.08 | 4227.08 | 4227.08 | 0.00 | 0.00 |
| $H_2O$ | 0.00 | 0.00 | 50907.67 | 6941.97 | 56617.35 | 56617.35 | 56617.35 | 0.00 | 0.00 |
| TOTAL | 0.00 | 0.00 | 54049.48 | 7370.40 | 61375.51 | 61375.51 | 61375.51 | 0.00 | 0.00 |

EXAMPLE 1

| Stream # | S-10 | S-11 | S-12 | S-13 | S-14 | S-15 | S-16 | S-17 | S-18 | S-19 |
|---|---|---|---|---|---|---|---|---|---|---|
| Pres, Psia | 22.5 | 23.5 | 17.0 | 22.0 | 20.0 | 20.0 | 20.0 | 25.00 | 21.3 | 65.0 |
| Temp, °F. | 210.0 | 236.6 | 219.4 | 211.0 | 186.0 | 186.0 | 186.0 | 232.3 | 232.3 | 298.0 |
| Gas, lb/h | 0 | 0 | 0 | 94492 | 68412 | 68412 | 0 | 0 | 31887 | 17024 |
| Comp, lb/mph | | | | | | | | | | |
| $N_2$ | 0.00 | 0.00 | 0.00 | 0.00 | 0.00 | 0.00 | 0.00 | 0.00 | 0.00 | 0.00 |
| $C_1$ | 0.00 | 0.00 | 0.00 | 0.00 | 0.00 | 0.00 | 0.00 | 0.00 | 0.00 | 0.00 |
| $C_2$ | 0.00 | 0.00 | 0.00 | 0.00 | 0.00 | 0.00 | 0.00 | 0.00 | 0.00 | 0.00 |
| $C_3$ | 0.00 | 0.00 | 0.00 | 0.00 | 0.00 | 0.00 | 0.00 | 0.00 | 0.00 | 0.00 |
| $C_4+$ | 0.00 | 0.00 | 0.00 | 0.00 | 0.00 | 0.00 | 0.00 | 0.00 | 0.00 | 0.00 |

-continued

|  |  |  |  |  |  |  |  |  |  |  |
|---|---|---|---|---|---|---|---|---|---|---|
| CO$_2$ | 0.00 | 0.00 | 0.00 | 1187.92 | 1187.92 | 1187.92 | 0.00 | 0.00 | 0.00 | 0.00 |
| H$_2$O | 0.00 | 0.00 | 0.00 | 2343.14 | 895.43 | 895.43 | 0.00 | 0.00 | 1770.00 | 945.00 |
| Total | 0.00 | 0.00 | 0.00 | 3531.06 | 2083.35 | 2083.35 | 0.00 | 0.00 | 1770.00 | 945.00 |
| Liquid, lb/h | 26513 | 17576 | 639 | 0 | 26080 | 0 | 26080 | 400000 | 368753 | 0 |
| Sp Gr @ PT | 0.960 | 0.948 | 0.956 | — | 0.969 | — | 0.969 | 1.181 | 1.210 | — |
| Comp. lb/mph |  |  |  |  |  |  |  |  |  |  |
| K$_2$CO$_3$ | 0.00 | 0.00 | 0.00 | 0.00 | 0.00 | 0.00 | 0.00 | 469.50 | 469.50 | 0.00 |
| KHCO$_3$ | 0.00 | 0.00 | 0.00 | 0.00 | 0.00 | 0.00 | 0.00 | 505.62 | 505.62 | 0.00 |
| H$_2$O | 1471.72 | 975.66 | 35.50 | 0.00 | 1447.71 | 0.00 | 1447.71 | 15800.18 | 14065.68 | 0.00 |
| TOTAL | 1471.72 | 975.66 | 35.50 | 0.00 | 1447.71 | 0.00 | 1447.71 | 16775.30 | 15040.80 | 0.00 |

From Example 1, it can be seen that in the illustrative instance raw natural gas stream S-1 containing $C_1$-$C_4$ hydrocarbons along with a significant amount of $CO_2$ is directed to the lower end of absorber 24 via inlet line 12 at a temperature of about 200.0° F. and at 515 psia. After contact of the raw gas with a lean alkaline scrubbing agent such as potassium carbonate contained in absorber 34, the treated gas leaves absorber 24 through line 28. The treated gas out has a slightly lower temperature of 200.0° F., but remains at 510 psia. In the example set forth, absorber 24 functions to lower the $CO_2$ content of the gas from an inlet value of 200.00 lbmph to about 12.08 lbmph.

Lean alkaline scrubbing solution is delivered to the upper end of absorber 24 as stream 4 entering through line 50 at a temperature of 200.0° F. and a pressure of 520 psia. The bypass line lean solution enters the intermediate portion of tower 24 as stream 3 directed into the tower via line 94 at a temperature of 241.3° F. and under a pressure of 520 psia.

A particular advantage of the present process is the fact that the hot aqueous alkaline solution is not subjected to flash before entering the absorber 24 which would decrease the absorption temperature, as has been previously practiced. The maintenance of the temperature of the hot scrubbing solution at a higher temperature at the time of the introduction thereof into the absorber insures the best available mass transfer coefficient which is a critical parameter in hot potassium carbonate absorption processes. In addition, the temperature of the alkaline scrubbing solution is significantly increased by virtue of the exothermic reaction in the absorber between the acid gas and the alkaline acid gas absorption agent. Absorption of acid gas by the potassium carbonate solution and conversion of a substantial part of the $K_2CO_3$ to $KHCO_3$ has the effect of substantially lowering the boiling point of the solution. The drop in boiling point as a result of $CO_2$ and/or $H_2S$ absorption at a representative scrubbing agent regenerating pressure may be tabulated as follows:

TABLE 1

| Conversion | Regeneration | Boiling Point |
|---|---|---|
| 35% | 22 psia | 238.6 F. |
| 45% | 22 psia | 235.1 F. |
| 55% | 22 psia | 229.0 F. |
| 65% | 22 psia | 218.9 F. |
| 75% | 22 psia | 202.6 F. |
| 80% | 22 psia | 190.8 F. |

In the above table, conversion is defined as the percentage of $K_2CO_3$ converted to $KHCO_3$. Thus, the conversions of pure $K_2CO_3$ and $KHCO_3$ are 0% and 100% respectively.

As a result of absorption of acid gases in the scrubbing solution and consequent conversion of a substantial proportion of the $K_2CO_3$ to $KHCO_3$, the liquid leaving absorber 24 via line 36 as stream 5 is at a temperature of 251.1° F. and a slightly lower pressure of 515.0 psia. The liquid of stream 5 is introduced into the tube side of reboiler 38 where it is brought into indirect heat exchange relationship with condensate from regenerator tower 44 entering reboiler 38 as stream 10 via line 72. It can be seen from the box score of Example 1 that the condensate entering reboiler shell 38 is at a temperature of 210° F. and a pressure of 22.5 psia.

The rich scrubbing solution leaving the tube side of reboiler 38 through line 42 as stream 6 is directed into the tube side inlet of reboiler 40 at the exemplary temperature of 243° F. and at a pressure of 510.0 psia. In the reboiler 40, the rich solution is brought into indirect heat exchange relationship with liquid derived from the shell side outlet of reboiler 38. Stream 11 supplied to reboiler shell 40 through line 78 in the table of Example 1 is at a temperature of 236.6° F. and under a pressure of 23.5 psia. The rich solution leaving the tube side outlet of reboiler 40 via line 46 is directed into regenerator tower 44 as stream 7 at an exemplary temperature of 229.0° F. and a pressure of 505.0 psia.

A part of the steam for regenerating the rich solution in regenerator tower 44 is supplied from a source thereof via line 84, identified in the example as stream 19 at a temperature of 298.0° F. and at a pressure of 65 psia. Although a significant part of the steam for use in stripping of the hot carbonate solution in regenerator column 44 is produced by the rich-reflux reboilers 38 and 40, the quantity of steam necessary to fully regenerate the alkaline scrubbing agent in regenerator column 44 must be augmented by importing of such steam, or burning of natural gas in a tube and shell exchanger to produce the required steam make-up for hot carbonate solution regeneration.

The steam supplied via line 84 and that is introduced into one of the inlets of steam jet 86, passes through the jet and is delivered to the lower end of regenerator tower 44 by way of line 88. The steam flowing through jet 86 serves to lower the pressure in line 90 connected to the inlet of the steam jet 86 to thereby lower the pressure in the shell side of reboiler 40. As a consequence, the steam thus produced in reboiler 40 is withdrawn as stream 8 which is introduced into the steam jet 86 for supplementing the steam required to effect regeneration of the rich scrubbing solution flowing through regenerator tower 44. In the exemplary process of Example 1, stream 8 is at a temperature 219.4° F. and at a pressure of 17.0 psia.

Steam formed in the shell side of reboiler 38 during heat exchange between the rich scrubbing solution of stream 5 and the condensate of stream 10 is removed from the reboiler shell as stream 9 and introduced into the steam flowing through line 88. Stream 9 in the exemplary process is at a temperature of 236.6° F. and under a pressure of 23.5 psia.

The water leaving the shell side of reboiler 40 as stream 12 is directed to reboiler 16 through line 100 at a temperature of 219.4° F. and under a pressure of 17.0 psia in the representative example. Recycle lean scrubbing solution returned to regenerator tower 44 as stream 17 connected to line 100 leading to reboiler 16, is at a temperature 232.3° F. and under a pressure of 25.0 psia. The steam produced in reboiler 16 is sent to the lower end of tower 44 in conjunction with recycle lean scrubbing solution and water stream 18. In the exemplary process, stream 18 is made up of water, $K_2CO_3$, $KHCO_3$, and steam.

Overhead stream 13 from regenerator tower 44 is made up of a mixture of water vapor and gaseous $CO_2$ which is conveyed to cooler 60 via line 56. Stream 13 in the exemplary process is at a temperature of 211.0° F. and 22.0 psia. After passage through cooler 60, stream 14 directed to knock out drum 62 via line 64 is at a temperature of 186° F. and under a pressure of 20.0 psia. Acid gas out from knock out drum 62 identified as stream 15 in the example is at a temperature of 186.0° F. and under a pressure of 20.0 psia. The majority of stream 15 is $CO_2$ combined with a minor proportion of water vapor. Liquid condensate returned to regenerator tower 44 as stream 16 via line 68 is shown as being at a temperature of 186.0° F. and 20.0 psia in Example 1.

In accordance with the preferred process, water vapor in the overhead from regenerator tower 44 is condensed in cooler 58, separated from the gaseous products in knock out drum 62 and then returned to section 71 of regenerator 44 as condensate for indirect heat exchange with the rich scrubbing solution introduced into the tube side of reboiler 38. If the overhead from regenerator column 44 is not cooled to condense water vapor therein, condensate may be imported to reboiler 38 for indirect heat exchange with the hot scrubbing solution.

In the case of a typical raw natural gas stream delivered from a compression station at 525 psia and 200° F. with a steam content of only 0.52% volume, the present process wherein energy is recovered from the hot rich scrubbing solution can reduce the outside energy input requirements by as much as 20%. This saving is exemplified by the following table:

TABLE 2

| | Conventional Design | Rich-Reflux Reboiler Design |
|---|---|---|
| Gas Rate: | 47.74 MMSCFD | 47.74 MMSCFD |
| $CO_2$ Removed: | 1187.92 LB MOLES/HR | 1187.92 LB MOLES/HB |
| Reboiler Steam: | 43,000 LB/HR | 31,900 LB/HR |
| Open Steam: | 18,000 LB/HR | 17,024 LB/HR |
| Total Steam: | 61,000 LB/HR | 48,924 LB/HR |
| Savings: | | 12,076 LB/HR (19.8%) |

The "conventional" design referred to in Table 2 is one that is capable of recovering energy from the raw gas stream, not applicable under the above conditions as in the cited Eickmeyer '582, '041 and '132 patents, the Osman '191 patent and Bensen et al. '810 patent previously identified, but does not have means for reclaiming thermal energy from the rich scrubbing solution prior to introduction of such solution into the regenerator.

A further refinement of this embodiment of the invention involves utilization of a single reboiler such as the vessel 40 in lieu of the combination of rich-reflux reboilers 38 and 40. In this instance, the use of means to reduce the pressure in shell side of reboiler 40 is desirable to increase the efficiency of the energy reclaiming operation. Steam jet 86 is a preferred vacuum inducing device in this respect because of its simplicity and lack of moving parts. Steam for operating the jet 86 may also be imported, or obtained from burning of natural gas in a suitable boiler. Whether or not the use of a steam jet to reduce the pressure on the shell side of the reboiler is economically justified in a particular situation can be ascertained by determining the cost of supplying import steam or producing additional steam in the steam boiler, as compared with the added amount of heat recovered from the rich scrubbing solution by use of a reboiler operated under vacuum conditions.

DETAILED DESCRIPTION OF AN ALTERNATE EMBODIMENT OF THE INVENTION

In the steam-reforming of natural gas to produce hydrogen for ammonia synthesis or hydrogenation reactions, the low temperature shift effluent contains significant quantities of $CO_2$ which must be removed prior to the ammonia synthesis step. A typical ammonia synthesis is schematically illustrated and described in Parrish U.S. Pat. No. 3,947,551. Where naphtha, fuel oil or coal is partially oxidized by reforming to produce methane, again large amounts of $CO_2$ are present in the effluent, together with smaller amounts of $H_2S$ if a sulfur bearing starting material is employed. The effluent from these processes also contains large amounts of steam. It is therefore necessary to remove the $CO_2$ and $H_2S$ from the methane synthesis raw gas.

Figure 2:
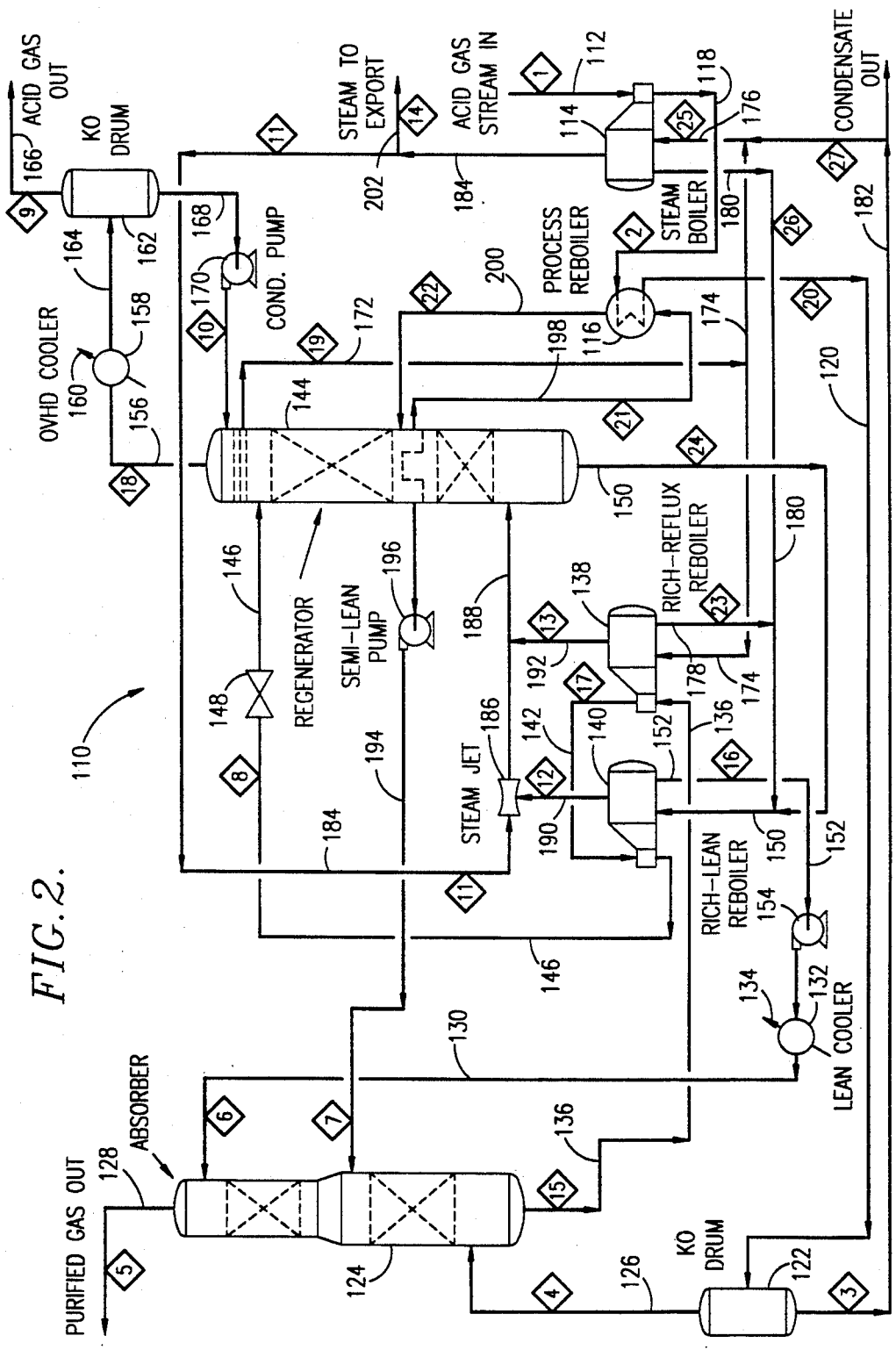
FIG. 2 is a diagrammatic flow sheet illustrating a second embodiment of the present invention wherein heat is not only recovered from the rich scrubbing solution, but also from the process gas itself for use in producing steam to strip the rich scrubbing solution, or for delivery to export.

Apparatus for recovering heat not only from the rich scrubbing solution but also from the process gas itself when the gas contains a significant amount of steam is illustrated in the schematic drawing of FIG. 2. In the system illustrated in FIG. 2, the raw process gas containing $CO_2$ and/or $H_2S$ is directed to the $CO_2$ and/or $H_2S$ removal system broadly designated 110 via line 112, which is connected to an inlet of the tube side of steam boiler 114. An outlet of the tube side of boiler 114 is also joined to an inlet of the tube side of a process reboiler 116 by a line 118. An outlet of the tube side of process reboiler 116 is connected by line 120 to an inlet of knock out drum 122. The process gas overhead from drum 122 is directed into the lower part of absorber column 124 via line 126. Absorber 124 is provided with suitable interior packing indicated schematically by the dashed lines and is adapted to receive a hot aqueous alkaline scrubbing agent such as potassium carbonate for removing $CO_2$ and/or $H_2S$ from the process gas. After absorption of the $CO_2$ and/or $H_2S$ in the potassium carbonate solution, the purified hydrogen gas overhead from absorber column 124 is directed to a point of use via line 128.

The lean hot aqueous alkaline scrubbing agent such as potassium carbonate is delivered to the upper part of absorber column 124 by a line 130 connected to an outlet of lean scrubbing solution cooler 132. Cooling water is furnished to the shell side of cooler 132 by a line 134.

Rich hot aqueous alkaline scrubbing solution is removed from the lower part of absorber column 124 by a line 136 which leads to an inlet of the tube side of a rich-reflux reboiler 138. An outlet of the tube side of reboiler 138 is connected to an inlet of the tube side of rich-lean reboiler 140 by a line 142. An outlet of the tube side of reboiler 140 is joined to the upper end of hot aqueous alkaline scrubbing solution regenerator column 144 by line 146 having a flow control valve 148 therein. The regenerator column 144 also includes suitable packing which is indicated schematically in the drawing by the dashed lines within the column outline.

Lean scrubbing solution is removed from the lower end of the regenerator column 144 by a line 150 which is connected to an inlet of the shell side of rich-lean reboiler 140. An outlet of the shell side of reboiler 140 is connected to an inlet of lean cooler 132 by a line 152 having a pump 154 therein.

The steam-acid gas overhead from regenerator column 144 leaves the column through line 156 connected to the tube side of an overhead cooler 158 provided with a cooling water line 160 joined thereto. The outlet of cooler 158 is joined to an inlet of knock out drum 162 by a line 164. Carbon dioxide and/or H₂S in gaseous form is removed from drum 162 by acid gas out line 166. Water condensate collected in drum 162 is redirected back to the top of regenerator column 144 by a line 168 having a condensate pump 170 therein. The condensate returned to the regenerator column 144 is removed from the top part thereof by a line 172 which is teed to a line 174. One end of line 174 communicates with a line 176 leading to an inlet of the shell side of steam boiler 114. The other end of line 174 is connected to an inlet of the shell side of rich-reflux reboiler 138. A line 178 connects an outlet of the shell side of rich-reflux reboiler 138 to a line 180 leading from an outlet of the shell side of steam boiler 114 to line 150 communicating with the shell side of rich-lean reboiler 140. Condensate from knock out drum 122 is removed from the lower part of such vessel and part of such condensate is returned to line 174 via line 182. The remaining condensate is sent to the steam generation system, or other export use of such condensate.

Steam recovered from the raw process gas in the shell side of steam boiler 114 is directed from an outlet thereof via line 184 to the inlet side of a multi-orifice steam jet 186. The outlet side of the steam jet 186 is connected directly to the lower part of regenerator column 144 by a line 188. A line 190 communicates the vacuum port side of steam jet 186 with an outlet of the shell side of rich-lean reboiler. Line 192 joins an outlet of the shell side of rich-reflux reboiler with line 188.

A semi-lean scrubbing solution line 194 interconnects an intermediate outlet of regenerator column 144 with an intermediate inlet of absorber column 124. Semi-lean pump 196 is interposed in line 194 between regenerator 144 and absorber 124 for returning semi-lean scrubbing solution to the central part of the absorber 124 from an intermediate zone of regenerator column 144.

Semi-lean scrubbing solution is also removed from the central part of regenerator column 144 via an outlet connected to line 198 which leads to an inlet of the shell side of process reboiler 116. An outlet of the shell side of process reboiler 116 is connected to an intermediate inlet of regenerator column 144 by a line 200.

Excess steam produced by the present process and not needed for steam stripping of the rich alkaline scrubbing agent may be directed to export via line 202.

A representative material balance for a process carried out using the apparatus shown schematically in FIG. 2, is shown in the box score of Example 2 hereunder

EXAMPLE 2

| Stream # | S-1 | S-2 | S-3 | S-4 | S-5 | S-6 | S-7 | S-8 | S-9 | S-10 |
|---|---|---|---|---|---|---|---|---|---|---|
| Pres, psia | 419.0 | 414.0 | 409.0 | 409.0 | 404.0 | 420.0 | 420.0 | 300.0 | 19.0 | 65.0 |
| Temp, °F. | 450.0 | 313.0 | 258.6 | 258.6 | 180.0 | 180.0 | 237.1 | 233.0 | 164.0 | 164.0 |
| Gas, lb/h | 294372 | 248679 | 0 | 215883 | 84381 | 0 | 0 | 0 | 131502 | 0 |
| Comp. lb/mph | | | | | | | | | | |
| $H_2$ | 7039.67 | 7039.67 | 0.00 | 7039.67 | 7039.67 | 0.00 | 0.00 | 0.00 | 0.00 | 0.00 |
| $N_2$ | 2292.99 | 2292.99 | 0.00 | 2292.99 | 2292.99 | 0.00 | 0.00 | 0.00 | 0.00 | 0.00 |
| Ar | 29.40 | 29.40 | 0.00 | 29.40 | 29.40 | 0.00 | 0.00 | 0.00 | 0.00 | 0.00 |
| $C_1$ | 37.86 | 37.86 | 0.00 | 37.86 | 37.86 | 0.00 | 0.00 | 0.00 | 0.00 | 0.00 |
| CO | 46.84 | 46.84 | 0.00 | 46.84 | 46.84 | 0.00 | 0.00 | 0.00 | 0.00 | 0.00 |
| $CO_2$ | 2597.44 | 2597.44 | 0.00 | 2597.44 | 4.73 | 0.00 | 0.00 | 0.00 | 2592.71 | 0.00 |
| $H_2O$ | 5470.75 | 2933.96 | 0.00 | 1113.16 | 147.31 | 0.00 | 0.00 | 0.00 | 965.85 | 0.00 |
| TOTAL | 17514.95 | 14978.16 | 0.00 | 13157.36 | 9598.80 | 0.00 | 0.00 | 0.00 | 3558.56 | 0.00 |
| Liquid, lb/h | 0 | 45693 | 78489 | 0 | 0 | 326374 | 2882507 | 3340326 | 0 | 83293 |
| Sp Gr @ PT | — | 0.912 | 0.939 | — | — | 1.238 | 1.184 | 1.188 | — | 0.976 |
| Comp. lb/mph | | | | | | | | | | |
| $K_2CO_3$ | 0.00 | 0.00 | 0.00 | 0.00 | 0.00 | 526.29 | 3119.10 | 1052.68 | 0.00 | 0.00 |
| $KHCO_3$ | 0.00 | 0.00 | 0.00 | 0.00 | 0.00 | 231.05 | 4158.80 | 9575.27 | 0.00 | 0.00 |
| $H_2O$ | 0.00 | 2536.79 | 4357.59 | 0.00 | 0.00 | 12804.85 | 113046.37 | 124224.36 | 0.00 | 4624.30 |
| TOTAL | 0.00 | 2536.79 | 4357.59 | 0.00 | 0.00 | 13562.19 | 120324.27 | 134852.31 | 0.00 | 4624.30 |

| Stream # | S-11 | S-12 | S-13 | S-14 | S-15 | S-16 | S-17 | S-18 | S-19 | S-20 |
|---|---|---|---|---|---|---|---|---|---|---|
| Pres, psia | 65.0 | 15.5 | 22.5 | 65.0 | 409.0 | 15.5 | 404.0 | 20.0 | 20.5 | 409.0 |
| Temp, F | 298.0 | 223.3 | 234.3 | 298.0 | 254.9 | 223.3 | 244.0 | 205.9 | 200.0 | 258.6 |
| Gas, lb/h | 43738 | 33311 | 27937 | 14563 | 0 | 0 | 0 | 214795 | 0 | 0 |
| Comp. lb/mph | | | | | | | | | | |
| $H_2$ | 0.00 | 0.00 | 0.00 | 0.00 | 0.00 | 0.00 | 0.00 | 0.00 | 0.00 | 7039.67 |
| $N_2$ | 0.00 | 0.00 | 0.00 | 0.00 | 0.00 | 0.00 | 0.00 | 0.00 | 0.00 | 2292.99 |
| Ar | 0.00 | 0.00 | 0.00 | 0.00 | 0.00 | 0.00 | 0.00 | 0.00 | 0.00 | 29.40 |
| $C_1$ | 0.00 | 0.00 | 0.00 | 0.00 | 0.00 | 0.00 | 0.00 | 0.00 | 0.00 | 37.86 |
| CO | 0.00 | 0.00 | 0.00 | 0.00 | 0.00 | 0.00 | 0.00 | 0.00 | 0.00 | 46.84 |
| $CO_2$ | 0.00 | 5.92 | 0.00 | 0.00 | 0.00 | 0.00 | 0.00 | 2592.71 | 0.00 | 2597.44 |
| $H_2O$ | 2428.25 | 1834.92 | 1551.04 | 808.54 | 0.00 | 0.00 | 0.00 | 5590.15 | 0.00 | 1113.16 |
| TOTAL | 2428.25 | 1840.84 | 1551.04 | 808.54 | 0.00 | 0.00 | 0.00 | 8182.86 | 0.00 | 13157.36 |
| Liquid, lb/h | 0 | 0 | 0 | 0 | 3340326 | 326374 | 3340326 | 0 | 86336 | 78489 |
| Sp Gr @ PT | — | — | — | — | 1.174 | 1.215 | 1.214 | — | 0.963 | 0.939 |
| Comp. lb/mph | | | | | | | | | | |
| $K_2CO_3$ | 0.00 | 0.00 | 0.00 | 0.00 | 1052.68 | 526.29 | 1052.68 | 0.00 | 0.00 | 0.00 |
| $KHCO_3$ | 0.00 | 0.00 | 0.00 | 0.00 | 9575.27 | 231.05 | 9575.27 | 0.00 | 0.00 | 0.00 |
| $H_2O$ | 0.00 | 0.00 | 0.00 | 0.00 | 124224.36 | 12804.85 | 124224.36 | 0.00 | 4793.25 | 4357.59 |

-continued

EXAMPLE 2

| | | | | | | | | | | |
|---|---|---|---|---|---|---|---|---|---|---|
| TOTAL | 0.00 | 0.00 | 0.00 | 0.00 | 134852.31 | 13562.19 | 134852.31 | 0.00 | 4793.25 | 4357.59 |

| Stream # | S-21 | S-22 | S-23 | S-24 | S-25 | S-26 | S-27 |
|---|---|---|---|---|---|---|---|
| Pres, psia | 22.0 | 22.0 | 22.5 | 22.5 | 65.0 | 65.0 | 409.0 |
| Temp, °F. | 237.2 | 243.0 | 234.3 | 243.6 | 200.0 | 298.0 | 258.6 |
| Gas, lb/h | 0 | 40253 | 0 | 0 | 0 | 0 | 0 |
| Comp. lb/mph | | | | | | | 0 |
| $H_2$ | 0.00 | 0.00 | 0.00 | 0.00 | 0.00 | 0.00 | 0.00 |
| $N_2$ | 0.00 | 0.00 | 0.00 | 0.00 | 0.00 | 0.00 | 0.00 |
| Ar | 0.00 | 0.00 | 0.00 | 0.00 | 0.00 | 0.00 | 0.00 |
| $C_1$ | 0.00 | 0.00 | 0.00 | 0.00 | 0.00 | 0.00 | 0.00 |
| CO | 0.00 | 0.00 | 0.00 | 0.00 | 0.00 | 0.00 | 0.00 |
| $CO_2$ | 0.00 | 64.00 | 0.00 | 0.00 | 0.00 | 0.00 | 0.00 |
| $H_2O$ | 0.00 | 2078.40 | 0.00 | 0.00 | 0.00 | 0.00 | 0.00 |
| TOTAL | 0.00 | 2142.40 | 0.00 | 0.00 | 0.00 | 0.00 | 0.00 |
| Liquid, lb/h | 270000 | 229747 | 5713 | 344764 | 67249 | 9208 | 14563 |
| Sp Gr @ PT | 1.184 | 1.239 | 0.950 | 1.203 | 0.963 | 0.919 | 0.939 |
| Comp. lb/mph | | | | | | | |
| $K_2CO_3$ | 292.16 | 356.16 | 0.00 | 520.37 | 0.00 | 0.00 | 0.00 |
| $KHCO_3$ | 389.55 | 261.55 | 0.00 | 242.89 | 0.00 | 0.00 | 0.00 |
| $H_2O$ | 10588.88 | 8574.48 | 317.18 | 13805.46 | 3733.57 | 511.21 | 808.54 |
| TOTAL | 11270.59 | 9192.19 | 317.18 | 14568.72 | 3733.57 | 511.21 | 808.54 |

From the above example, it can be seen that in the illustrative instance where raw gas stream S-1 is brought into system 110 via line 112 at a temperature of about 450° F. and at 419 psia, the stream S-2 leaving such reboiler may for example be lowered to a temperature of 313° F. at a pressure of 414 psia. Indirect heat exchange of the raw gas against water condensate introduced via stream S-25 at 200° F. and made up of water condensate stream S-27 from drum 122 supplied via line 182, and water condensate stream S-19 from the top of regenerator column 44 furnished via line 172, produces steam at 298° F. and 65 psia identified as stream S-11 which is directed to steam jet 186 via line 184, and thence to the lower end of regenerator column 144 through line 188.

The overhead gas at an exemplary temperature of 258.6° F. and under a pressure of 409 psia leaves knock out drum 122 in the form of stream S-4 which is conveyed via line 126 to the lower part of absorber column 124. The raw gas containing $CO_2$ and/or $H_2S$ is brought into contact with a hot aqueous alkaline scrubbing solution such as potassium carbonate in the form of stream S-6 introduced into the absorber column 124 through line 130. The alkaline scrubbing agent in the example given is at a temperature of 180° F. and a pressure of 420 psia.

In the illustrative example, the rich scrubbing solution leaving absorber 124 as stream S-15 is at a temperature of 254.9° F. and under a pressure of 409 psia. That stream is directed into the tube side of rich-reflux boiler 138 for heat exchange with condensate from stream S-19 supplied to the shell side of the reboiler 138. The condensate, at a temperature of 200° F. and under a pressure of 20.5 psia, enters the shell side of reboiler 138 by gravitational flow. Indirect heat exchange between the condensate and the rich scrubbing solution in reboiler 138 produces a quantity of steam which is directed to line 188 in the form of stream S-13 which it can be seen from the exemplary table above is at 234.3° F. and under a pressure of 22.5 psia. It is evident from the box score that the temperature approach between the rich scrubbing solution and the condensate supplied to rich-reflux reboiler is in the order of +25° F. This results in significant steam being produced in the reboiler for use as alkaline agent regenerating steam. For example, in the table, the steam produced in reboiler 138 and which is delivered to the regenerator 144 as stream S-13 provides 27,937 pounds per hour of steam which combines with streams S-12 and S-11.

Furthermore, in the example set forth, the rich scrubbing solution leaving rich-reflux reboiler 138 as stream S-17 is brought into indirect heat exchange with condensate from rich-reflux boiler 138 at a temperature approach of about +10° F. Stream S-17 enters the tube side of rich-lean reboiler 140 at a temperature of about 244° F. and a pressure of 404 psia while the condensate derived from rich-reflux reboiler 138 which is directed to the shell side of rich-lean reboiler 140 is at a temperature of about 234.3° F. and a pressure of 22.5 psia.

Steam production is enhanced in the rich-lean reboiler 140 notwithstanding the closer temperature approach between the condensate and the rich scrubbing solution than was the case in the instance of rich-reflux reboiler 138 by virtue of the fact that a vacuum is maintained on the condensate in the shell side of rich-lean reboiler 140. This vacuum condition is produced by the steam jet 186 wherein the vacuum port of the jet is connected to the shell side of rich-lean reboiler by line 190. As a consequence, the pressure of the steam leaving rich-lean reboiler 140 as stream S-12 for delivery to the steam stripping line 188 connected to regenerator 144, is at a level of about 15.5 psia while the steam is at a temperature of 223.3° F. In the example of the table above, 33,311 pounds per hour of steam are delivered to line 188 as stream S-12.

It is thus important to note that the temperature of the lean scrubbing solution entering absorber column 124 as stream S-6 is at a temperature of 180° F. and under a pressure of 420 psia and stream S-7 at a temperature of 237° F. and under a pressure of 420 psia, but the rich scrubbing solution leaving the column 124 as stream S-15 is a temperature of 254.9° F. and under a pressure of 409 psia, and is thus well above its boiling point. This elevation in temperature is attributable to the contact of the scrubbing solution with the raw gas entering absorber column 124 as stream S-4 at a temperature of 258.6° F. and under a pressure of 409 psia as well as the $CO_2$ and/or $H_2S$ absorption into the scrubbing agent. Reclaiming of energy from this hot rich scrubbing solution leaving absorber column 124 as stream S-15 results in a corresponding energy reduction for system 110 of at least around 10%. Recovery of heat as steam from the rich scrubbing solution is limited primarily by an acceptable temperature approach between the rich scrubbing solution and the condensate with a temperature approach of at least +2° F. being a requisite for efficient operation. Best results are obtained when the temperature approach between the rich scrubbing solution and the condensate is maintained at a level of at least +5° F. as in the example above.

In the instance of example given, where the low temperature shift effluent from a steam reforming reaction is treated in system 110, a process having parameters of the general values given in the example provides 50 psig steam which can be used to drive the steam jets of jet assembly 186 without the need for other auxiliary equipment. However, if desired and for other operating parameters, higher pressure steam driven jets may be used or compressors may be employed for this purpose.

It is also noteworthy that pure steam as stream S-13 is produced as the gaseous overhead from rich-reflux reboiler 138, and similarly that pure steam is produced as the overhead stream S-12 from rich-lean reboiler 140, thus permitting introduction of this steam directly into the stream stripping line 188 without exacting an extra heat load on the regenerator column 144. In the case of schemes where the scrubbing solution such as stream S-7 leaving regenerator column 144 are flashed to produce steam, this not only limits the use of such steam because it contains some $CO_2$ when returned to the regenerator 144, but also causes additional vapor traffic in the regenerator column 144. In like manner, utilization of the reboilers 138 and 140 to produce steam while at the same time lowering the temperature of the rich scrubbing solution assists in alleviation of severe flash in the stripper which can cause liquid distribution difficulties in the regenerator column 144.

The improved results that are obtained with the preferred embodiment of the present process as compared with a conventional hot potassium carbonate absorption system are exemplified by the following comparison:

TABLE 3

Capacity: 900 ST/D NH3 plant
CO2 Removed: 1370 ST/D

| Configuration | Stripping duty (MMBTU/H) | Open Stream (LB/H) | Export Stream (LB/H) |
| --- | --- | --- | --- |
| Conventional | 95.57 | 11,040 | n.a. |
| Rich-reflux (without vacuum) | 94.00 | 0 | n.a. |
| Rich-reflux (vacuum/ steam jet) | 80.90 | 0 | 14,563 |
| Rich-reflux (vacuum/steam jet + compressor) | 69.40 | 0 | 25,860 |

NOTE:
Export steam pressure is 50 psig

As is also apparent from the exemplary example of Table 3 above, and assuming the parameters of that example, not only is adequate steam produced for full stripping of the rich scrubbing solution supplied to the regenerator column 44, but in addition, 14,563 pounds per hour of steam at a temperature of 298° F. and a pressure of 65 psia is available for export.

I claim:

1. A process for removal of an acid gas from a gaseous mixture comprising the steps of:
   bringing the mixture into contact with a sufficient amount of a lean aqueous solution of an alkaline scrubbing agent under an elevated absorption pressure to effect absorption of the acid gas by the agent to produce a rich scrubbing solution and which also results in raising of the temperature of the rich scrubbing solution to a temperature of at least about 180° F. by virtue of the exothermic reaction between the acid gas and the alkaline agent;
   regenerating the rich scrubbing solution at a regeneration pressure substantially less than said absorption pressure by subjecting the rich solution to sufficient stripping steam to remove acid gas therefrom so that the resulting lean scrubbing solution may be reused for acid gas absorption;
   bringing the rich scrubbing solution at said temperature of at least about 180° F. into indirect heat exchange relationship with condensate at a lower temperature than the rich scrubbing solution and at a pressure above said regeneration pressure,
   the temperature approach between the rich scrubbing solution and the condensate being maintained at a value no less than about +2° F.;
   maintaining the rich scrubbing solution in heat exchange relationship with said condensate for a time period sufficient to lower the temperature of the scrubbing solution and effect heating of at least a part of the condensate to a level to produce secondary steam; and
   collecting the secondary steam and adding such secondary steam to the stripping steam used for regeneration of the rich scrubbing solution.

2. A process as set forth in claim 1, wherein is included the steps of bringing the condensate which has been heated to produce secondary steam into further indirect heat exchange relationship with the rich scrubbing solution at a temperature above about 180° F. and at a pressure above said regeneration pressure for a time period sufficient to effect additional heating of at least a part of the condensate to a level to produce tertiary steam, the temperature approach between the rich scrubbing solution and the condensate during production of said tertiary steam being maintained at a value no less than about +2° F., and collecting the tertiary steam so that it may be used in conjunction with the primary and secondary steam to effect steam stripping of the rich scrubbing solution.

3. A process as set forth in claim 1, wherein is included the step of decreasing the pressure on the condensate during production of tertiary steam therefrom to enhance the degree of tertiary steam production.

4. A process as set forth in claim 3, wherein said step of decreasing the pressure on the condensate is accomplished by communicating the condensate with the vacuum port of a steam jet while the condensate is in indirect heat exchange relationship with the rich scrubbing solution.

5. A process as set forth in claim 3, wherein the steam exiting from the steam jet is combined with the tertiary steam and the secondary steam for use thereof to effect stripping of the rich scrubbing solution.

6. A process as set forth in claim 1, wherein is included the step of maintaining the temperature approach between the rich scrubbing solution and the condensate at a level of at least about +5° F.

7. A process as set forth in claim 1, wherein is included the steps of bringing the rich scrubbing solution at a temperature above about 240° F. into heat exchange relationship with the condensate, and maintaining the condensate at a temperature no greater than about 230° F. prior to the condensate being brought into indirect heat exchange relationship with the rich scrubbing solution.

8. A process as set forth in claim 1, wherein is included in the step of deriving said condensate by condensing at least part of the steam utilized to effect stripping of the rich scrubbing solution.

9. A process as set forth in claim 1 wherein said indirect heat exchange of the condensate with the rich scrubbing solution includes the steps of providing a rich-reflux reboiler, and introducing the rich scrubbing solution into the rich-reflux reboiler for said indirect heat exchange with the condensate.

10. A process as set forth in claim 9, wherein is included the step of providing a rich-lean reboiler, and further including the steps of directing the rich scrubbing solution and the condensate to the rich-reflux reboiler and the rich-lean reboiler in successive order.

11. A process as set forth in claim 9, wherein is included the step of imposing a vacuum condition on the condensate side of the rich-lean reboiler to enhance recovery of steam from the condensate.

12. A process as set forth in claim 11, wherein the acid gas-containing mixture which is brought into contact with the lean aqueous alkaline scrubbing agent contains a quantity of steam, and wherein the step of imposing a vacuum condition on the rich-lean reboiler includes the step of providing a steam jet, directing steam removed from the gaseous mixture prior to introduction thereof into the absorber, into the steam jet, and communicating the reduced pressure part of the steam jet with the condensate side of the rich-lean reboiler to impose said vacuum condition on the rich-lean reboiler.

13. A process as set forth in claim 12, wherein is included the step of bringing the condensate from the rich-reflux reboiler into indirect heat exchange relationship with the rich scrubbing solution after the latter has been directed through the rich-reflux reboiler.

14. A process as set forth in claim 13, wherein is included the step of maintaining the temperature approach between the rich scrubbing solution and the condensate directed to the rich-lean reboiler at a level of at least about +5° F.

15. A process as set forth in claim 13, wherein is included the steps of bringing the rich scrubbing solution into the rich-lean reboiler at a temperature above about 240° F., and maintaining the condensate directed to the rich-lean reboiler at a temperature no greater than about 230° F.

16. In a process as set forth in claim 9, wherein is included the step of deriving the condensate by condensing at least a part of the steam used to effect stripping of the rich scrubbing solution.

17. A process for removal of an acid gas from a gaseous mixture comprising the steps of:
bringing the mixture into contact with a sufficient amount of a lean aqueous solution of an alkaline scrubbing agent under an elevated absorption pressure to affect absorption of the acid gas by the agent therein and raise the temperature of the resulting rich scrubbing solution to a level of at least about 180° F. by virtue of the exothermic reaction between the acid gas and the alkaline agent;
regenerating the rich scrubbing solution at a regeneration pressure substantially less than said absorption pressure by subjecting the rich solution to sufficient stripping steam to remove acid gas therefrom so that the resulting lean scrubbing solution may be reused for acid gas absorption;
bringing the rich scrubbing solution at said temperature of at least about 180° F. into indirect heat exchange relationship with condensate at a lower temperature then the rich scrubbing solution and at a pressure above said regeneration pressure,
the temperature approach between the rich scrubbing solution and the condensate being maintained at a value no less than about +2° F.;
maintaining the rich scrubbing solution in heat exchange relationship with said condensate for a third period sufficient to lower the temperature of the scrubbing solution and effect heating of at least a part of the condensate to a level to produce secondary steam; and
collecting the secondary steam and exporting such steam to a remote point for use thereof.

18. Apparatus for removing an acid gas from a gaseous mixture said apparatus including:
means for bringing the mixture into contact with a sufficient amount of a lean aqueous solution of an alkaline scrubbing agent under an elevated absorption pressure to effect absorption of the acid gas by the agent to produce a rich scrubbing solution and which also results in raising of the temperature of the rich scrubbing solution to a temperature of least about 180° F. by virtue of the exothermic reaction between the acid gas and the alkaline agent;
means for regenerating the rich scrubbing solution to its lean condition by steam stripping for reuse of the solution;
means for recovering heat of reaction derived thermal energy from the rich scrubbing solution to produce steam for use as at least a part of the steam required to steam strip the rich scrubbing solution to remove absorbed acid gas therefrom, said heat recovery means including
a rich-reflux reboiler,
means for directing condensate into the rich-reflux reboiler,
means for introducing the rich scrubbing solution at a temperature above about 180° F. and at a pressure above said regeneration pressure into the rich-reflux reboiler for indirect heat exchange with the condensate supplied thereto at a lower temperature than the rich scrubbing solution,
the temperature approach between the rich scrubbing solution and the condensate being maintained at a value no less than about +2° F.,
means for maintaining the rich scrubbing solution in indirect heat exchange relationship with the condensate in said rich-reflux reboiler at a pressure above said regeneration pressure and for a time period sufficient to lower the temperature of the scrubbing solution and effect boiling of at least a part of the condensate to produce secondary steam, and
means for recovering secondary steam from the rich-reflux reboiler; and
means for conveying at least a portion of the secondary steam recovered from the rich-reflux reboiler to the regenerator to effect steam stripping of the rich scrubbing solution delivered thereto.

19. Apparatus as set forth in claim 18, wherein is provided a rich-lean reboiler, and means for directing the rich scrubbing solution and the condensate to the rich-reflux reboiler and the rich-lean reboiler in successive order and at a pressure above said regeneration pressure.

20. Apparatus as set forth in claim 19, wherein is provided a steam jet with an inlet, an outlet and a vacuum port, means for directing steam to the jet for flow between the inlet and outlet thereof, and means for communicating the vacuum port of the jet with the condensate side of the rich-lean reboiler.

21. Apparatus as set forth in claim 18 where in is provided means for directing condensate to said rich-reflux reboiler which has been derived from condensation of at least a part of the steam used to effect stripping of the rich solution in the regenerator.

* * * * *